July 5, 1966 D. H. CRALL 3,259,521
FILTER SYSTEM AND METHOD FOR PRESSURE COOKER
Filed June 14, 1963
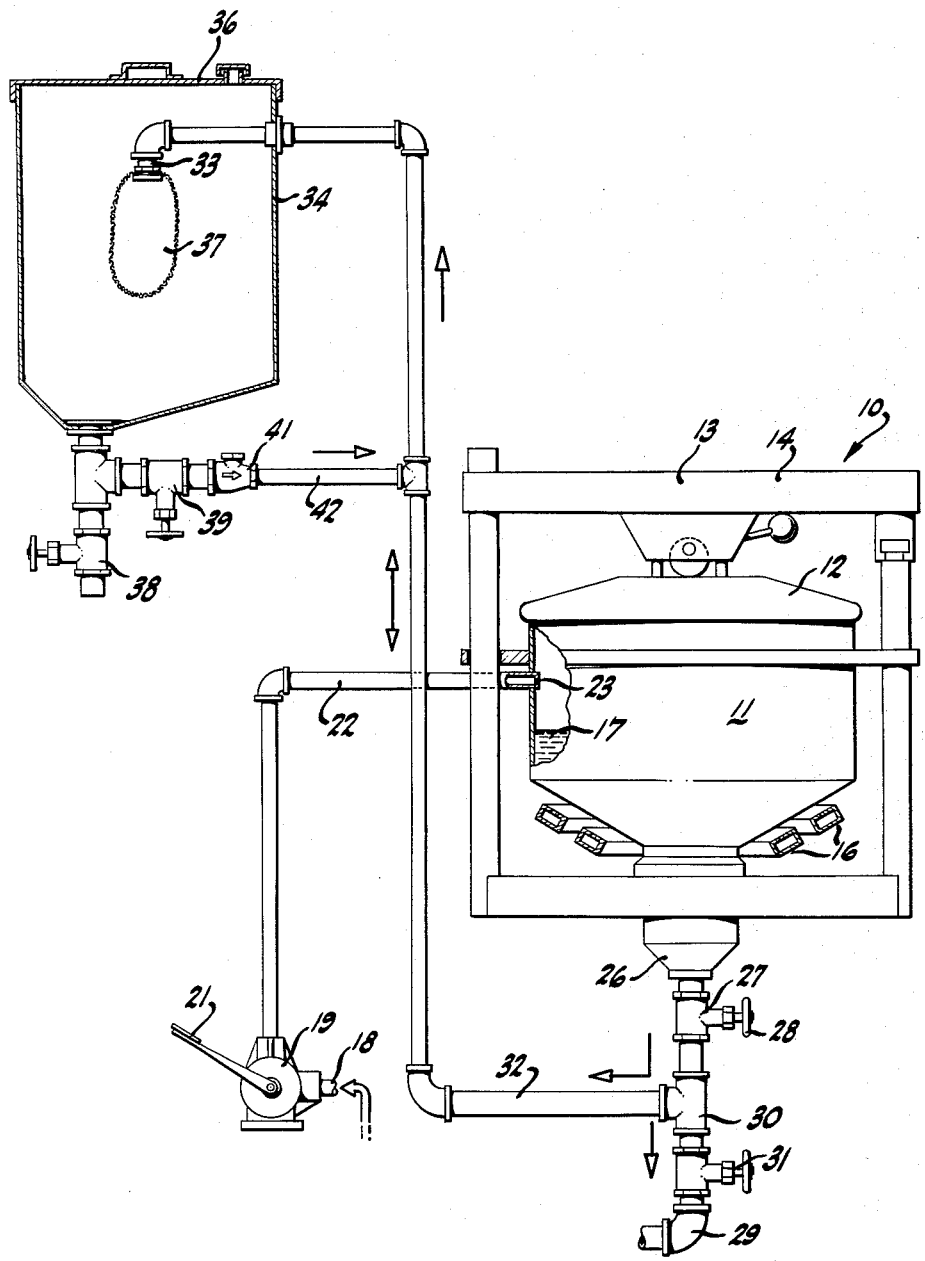
INVENTOR.
DONALD H. CRALL
BY
ATTORNEY 3,259,521
FILTER SYSTEM AND METHOD FOR
PRESSURE COOKER
Donald H. Crali, 756 Woodside Road,
Redwood City, Calif.
Filed June 14, 1963, Ser. No. 287,985
4 Claims. (Cl. 134—22)

This invention relates to a new and improved filter system and method of filtering for a pressure cooker of the type using cooking oil. More particularly the present invention provides a filter for use in connection with a deep fat pressure cooker machine of the type commercially available and known as the Broaster produced by The Broaster Co. of Rockford, Illinois, and shown in one or more of the following Patents: Nos. 2,827,379; 2,917,200; 2,918,861; 2,938,648 and 2,942,753.

The Broaster heretofore mentioned comprises a pressure vessel which is heated so that the fat contained therein is elevated to temperature substantially above the boiling point of water. Provision is made for the injection of water into the vessel through the instrumentality of a pedal-operated pump. The combination of steam pressure and hot oil cooks chicken and similar products which are suspended in the oil in a wire basket rapidly and with a taste which is improved over prior methods of frying chicken. The details of the commercially available broaster form no part of the present invention and are referred to herein as a reference for the system and method hereinafter described in detail.

One of the problems in the maintenance of the broaster and similar machines is the frequent filtration of the cooking oil and cleaning of the vessel required because of the likelihood that small particles of food fall into the oil and with the passage of time contaminate the oil and collect in the vessel. Heretofore machines of this type have been filtered by draining the hot oil from the bottom of the vessel into a small container and then lifting the container and pouring the hot oil through a filter, or by the use of a portable pump, filter and tank assembly which by use of a flexible hose inserted into the hot oil, from the open top pumps the hot oil from the vessel through a filter into the tank. After the hot oil is all removed, the vessel is cleaned and the cleaning water drained. The filtered oil is then returned to the vessel by reversing the pump on the portable assembly or by manual transportation of containers from the filter. Such an operation is extremely time-consuming and hazardous. The present invention has for its principal objects the reduction in the amount of time and labor required to accomplish the filtration, as well as safety.

More specifically, the present invention provides a method and system whereby when it is desired to filter the oil from the pressure vessel water is injected into the vessel in the way and by the means provided as standard equipment and the steam generated by reason of the fact that the oil is above the boiling point of water is used to drive the oil out through a valve at the bottom of the vessel and into a filter. In the preferred form of filter the oil drive out of the pressure vessel drains through a filter bag made of cloth, the foreign material being caught in the bag. The filtered oil is held in a tank below the filter bag while the cleaning of the vessel is accomplished. After the vessel has been cleaned the filtered oil is drained back into the pressure vessel by gravity.

It is, accordingly, a feature of the present invention that steam pressure is used to drive the oil up to the filter medium.

A still further feature of the invention is the provision of a valve to trap the oil in the filter tank while the pressure vessel is being cleaned.

As has been mentioned, an important feature of the invention is the reduction in hazard of handling hot oil. In accordance with this system and method there is no likelihood of personnel being injured in such manner.

Further, the time required to filter in accordance with this invention is so brief that the oil may be filtered even during a busy period without undue interruption of service to customers. This makes possible more frequent filtration and hence improves taste and appearance of the product, prevents contamination of the oil and thus prolongs the use thereof and generally improves operation.

Other objects of the present invention will become apparent upon reading the following specification and referring to the accompanying drawing illustrating schematically, partially broken away in section, a broaster with the present invention incorporated therein.

As shown more or less schematically in the accompanying drawing, a standard broaster machine 10 is employed. Such a machine has a pressure vessel or cylinder 11 fitted with a pressure-tight lid 12 which is held thereon by means of a lid holddown means 13 actuated by handle 14. Gas burner 16 or other means is used to heat the oil 17 which partially fills the interior of the vessel 11. Water from a water pipe 18 is pumped by means of pump 19 which is actuated by pedal 21 through pipe 22 which terminates in jets 23 near the top of vessel 11. The oil 17 is maintained during the operation of the machine at a temperature above the boiling point of water. Hence when water is forced into the container 11 through jets 23 steam is generated. Food substance such as parts of chicken are suspended in a wire basket (not shown) inside vessel 11. The combination of the steam pressure in the vessel and the hot oil fries the food product.

From time to time it is necessary to filter or change the oil 17. A sump 26 is provided at the bottom of vessel 11 and such sump can discharge through a valve 27 controlled by handle 28. Normally, valve 27 is used to discharge oil into containers which are used to fill a filter tank. Meanwhile, the interior of vessel 11 is cleaned by scrubbing and the rinse water drained out through drain 29. Present methods of filtering the oil and cleaning the vessel are hazardous, laborious, and time consuming, and these disadvantages are eliminated by means of the present invention.

In accordance with the present invention a T 30 is installed in the discharge from valve 27 and valve 31 between T 30 and drain 29. Valve 31 is opened only when it is necessary to discharge the water or solvent used to clean the vessel 11 after the oil has been removed. Another pipe 32 leads from T 30 up to a discharge port 33 inside of filter tank 34 which is elevated above the level of vessel 11. Tank 34 is of sufficient capacity to hold the entire contents of the oil in vessel 11 at one time. Preferably such tank 34 is at atmospheric pressure and has a lid 36 which prevents foreign material from falling into the oil. The discharge port 33 is near the top of the tank and a cloth filter bag 37 is attached to receive the entire discharge from the port. Such a filter bag is not herein illustrated in detail but is an ordinary cloth filter bag which has a draw string at the top. The draw string is used to bring the neck of the bag tightly around the fitting at port 33.

The means used to drive the oil out of the pressure vessel is a unique feature of the machine which takes advantage of the fact that water is injected into the pressure vessel 11 during cooking operation. Accordingly, with the temperature of the oil 17 above the boiling point of water but preferably with the burners 16 extinguished, the user by actuation of pedal 21 drives water into the container 11 through the orifices 23. The formation of steam forces the oil out through valve 27 and up out through the port 33 and through the filter bag 37 and into tank 34. Valves 38 and 39 which govern the discharge of tank 34 are closed. Further, there is a check valve 41 installed in the pipe 42 which leads from valve 39 back to pipe 32 so that the direction of flow is only as indicated by the arrow in the accompanying drawing. With valves 38 and 39 closed and the pressure at atmosphere, the user opens lid 12 and then thoroughly cleans the inside of container 11 using water or other solvent. Valves 27 and 31 are turned so that the water or solvent discharges through drain 29 and thereupon the vessel is ready for refilling. When it is desired to refill the same, valve 31 is closed and valves 39 and 27 are open. Oil runs by gravity through pipes 42 and 32 back into the container 11. Thereupon valve 27 is closed.

If it is desired to drain the oil, this may be accomplished by opening valve 38 when tank 34 has been filled.

Although the foregoing invention has been described in some detail, by way of illustration and example for purposes of clarity of understanding, it is understood that certain changes and modifications may be practiced within the spirit of the invention and scope of the appended claims.

What is claimed is:

1. A filter system of the character described comprising a pressure vessel for a quantity of liquid, means for heating the contents of said vessel above the boiling point of water, pump means for forcing water under pressure into said vessel, a first discharge for liquid leading from said vessel, first valve means controlling flow out of said first discharge, a filter tank elevated above said vessel, a conduit from said first discharge to said tank, filter means for removing foreign material in liquid flowing through said conduit into said tank, a second discharge in said tank, second valve means controlling flow from said second discharge, and a second conduit from said second discharge back to said vessel, whereby with liquid in said vessel above the boiling point of water and with said first valve means open and said second valve means closed, water may be forced into said vessel by said pump means to form steam in said vessel to force liquid out of said vessel through said first conduit and said filter means into said tank and held in said tank while said vessel is cleaned and then with said second valve means open said liquid may be drained by gravity back from said filter tank to said vessel.

2. A system according to claim 1 which further comprises drain means for said vessel and a third valve between said first valve means and said drain means controlling flow from said vessel either to said first conduit or to said drain means.

3. A method of filtering cooking oil in a pressure vessel comprising heating said vessel and oil above the boiling point of water, sealing said vessel from atmosphere, forcing water into said vessel to form steam under pressure in said vessel, conducting oil forced from said vessel by steam pressure to a holding tank located above said vessel; filtering said oil as it is conducted to said tank, holding said oil in said tank, and subsequently flowing said oil by gravity from said tank back to said vessel.

4. A method of filtering cooking oil in a pressure vessel comprising heating said vessel and oil above the boiling point of water, sealing said vessel from atmosphere, forcing water into said vessel to form steam under pressure in said vessel, conducting oil forced from said vessel by steam pressure to a holding tank located above said vessel; filtering said oil as it is conducted to said tank, holding said oil in said tank, unsealing said vessel, cleaning said vessel with liquid, draining said liquid from sad vessel, and flowing said oil in filtered condition by gravity from said tank back into said vessel.

References Cited by the Examiner

UNITED STATES PATENTS

| 2,733,815 | 2/1956 | Kwochka et al. | 210—416 X |
| 3,159,095 | 12/1964 | Wagoner | 99—408 |

REUBEN FRIEDMAN, *Primary Examiner.*

S. ZAHARNA, *Assistant Examiner.*